(12) United States Patent
Habib et al.

(10) Patent No.: US 9,375,718 B2
(45) Date of Patent: Jun. 28, 2016

(54) SHAFT-TO-ROLLER ATTACHMENT FOR CLINKER GRINDER ROLLER

(75) Inventors: Tony F. Habib, Lancaster, OH (US); Robert W. Honaker, Pickerington, OH (US); Clint M. Sowers, Ashville, OH (US); Stephen J. Lukezich, Canal Winchester, OH (US); Breck J. Hardy, Carroll, OH (US)

(73) Assignee: DIAMOND POWER INTERNATIONAL, INC., Lancaster, OH (US)

( * ) Notice: Subject to any disclaimer, the term of this patent is extended or adjusted under 35 U.S.C. 154(b) by 1289 days.

(21) Appl. No.: 13/275,826

(22) Filed: Oct. 18, 2011

(65) Prior Publication Data

US 2013/0092776 A1   Apr. 18, 2013

(51) Int. Cl.
| | |
|---|---|
| B02C 4/08 | (2006.01) |
| B21B 27/03 | (2006.01) |
| B21B 31/08 | (2006.01) |
| B02C 4/30 | (2006.01) |
| F23J 1/00 | (2006.01) |
| B27G 13/02 | (2006.01) |

(Continued)

(52) U.S. Cl.
CPC ... *B02C 4/08* (2013.01); *B02C 4/30* (2013.01); *B21B 27/03* (2013.01); *B21B 31/08* (2013.01); *F23J 1/00* (2013.01); *A01D 43/10* (2013.01); *A01D 82/00* (2013.01); *A01F 12/40* (2013.01); *B27G 13/02* (2013.01); *F23J 2900/01003* (2013.01); *Y10T 29/49547* (2015.01)

(58) Field of Classification Search
CPC ........ B21B 27/00; B21B 27/02; B21B 27/03; B21B 31/08; B21B 13/008; B21B 27/032; B21B 27/035; B02C 4/30; B02C 4/305; B02C 4/08; B02C 18/00; B27C 1/14; B27C 1/005; B27G 13/12; B27G 13/02; A01D 43/006; A01D 43/10; A01D 43/107; A01D 82/00; A01D 82/02; A01F 12/40; B24B 41/04; B24B 45/00; B24B 45/003; B24B 23/005
USPC ................... 83/665, 666; 407/25, 26, 27, 12; 144/250.1, 250.11, 250.13, 250.16, 144/246.1, 248.3, 248.7; 241/220, 227, 241/221; 492/47
See application file for complete search history.

(56) References Cited

U.S. PATENT DOCUMENTS

| | | | |
|---|---|---|---|
| 2,629,616 A | 2/1953 | McVey | |
| 3,990,802 A * | 11/1976 | Corona | ................... H02K 1/28 310/216.116 |

(Continued)

FOREIGN PATENT DOCUMENTS

| | | |
|---|---|---|
| GB | 255 781 | 7/1926 |
| JP | 57-161314 | 10/1982 |

*Primary Examiner* — Matthew G Katcoff
(74) *Attorney, Agent, or Firm* — Brinks Gilson & Lione

(57) ABSTRACT

A grinder roller assembly and a method of forming a grinder roller assembly are provided. The grinder roller assembly includes an elongated shaft that comprises a shaft outer surface. The grinder roller assembly further includes an insert plate. The insert plate has a plate outer surface that is noncircular and substantially smooth. The insert plate further has a plate opening that defines a plate inner surface and is configured to receive the elongated shaft. The grinder roller assembly further includes a roller having a roller opening that defines a roller inner surface that cooperates with the plate outer surface. The grinder roller assembly further includes at least one fastener that attaches the insert plate to the elongated shaft.

26 Claims, 4 Drawing Sheets

(51) Int. Cl.
*A01D 82/00* (2006.01)
*A01D 43/10* (2006.01)
*A01F 12/40* (2006.01)

(56) References Cited

U.S. PATENT DOCUMENTS

| | | |
|---|---|---|
| 4,232,834 A | 11/1980 | Player et al. |
| 4,555,066 A | 11/1985 | Gibson |
| 4,617,709 A | 10/1986 | Gundlach |
| 4,807,820 A | 2/1989 | Gundlach |
| 5,211,327 A | 5/1993 | Clarke et al. |
| 5,312,056 A | 5/1994 | Kastingschafer et al. |
| 5,902,685 A | 5/1999 | Schroder et al. |
| 6,092,571 A * | 7/2000 | Liao ............ B23Q 17/20 144/117.1 |
| 6,203,588 B1 | 3/2001 | Schroder et al. |
| 6,523,767 B1 | 2/2003 | Ramesohl |
| 6,969,018 B2 | 11/2005 | Ibanez et al. |
| 7,024,899 B2 * | 4/2006 | Klingen ............ B21B 31/08 72/78 |
| 7,290,987 B1 | 11/2007 | Morin |
| 7,296,763 B2 | 11/2007 | Bliss et al. |
| 7,322,174 B2 * | 1/2008 | Desnijder ............ A01D 82/02 56/16.4 B |
| 7,438,097 B2 | 10/2008 | Davis |

\* cited by examiner

SHAFT-TO-ROLLER ATTACHMENT FOR CLINKER GRINDER ROLLER

BACKGROUND

1. Field of the Invention

The present invention generally relates to a roller for a clinker grinder. More specifically, the present invention relates to an attachment for a clinker grinder roller to a related drive shaft.

2. Description of the Related Art

Large coal burning power plants and furnaces produce ash as a combustion byproduct. The ash typically accumulates as a powder and in large chunks referred to as "clinkers." A clinker grinder machine is used to grind the ash clinkers into small particles so that the ash can be transported for disposal through pipes pneumatically or hydraulically. Clinker grinders typically have one or two large drum rollers with grinding teeth on the surface of the rollers. The rollers are rotated so that the grinding teeth grind the clinkers. Clinker grinder machines operate in a hot, corrosive, and erosive environment and experience severe operating loads, yet must operate for long periods without failure. A particularly difficult design challenge is providing an attachment between the grinder roller and the drive shaft that rotates the roller. The roller grinding surfaces are typically formed of very hard abrasion-resistant alloyed cast iron. This class of cast irons is virtually unweldable, so welding a roller made of such alloys to the driving shaft is not an option. To address the design challenges, current common practice is to attach the clinker grinder roller to the rotatable drive shaft via an insert plate to form a grinder roller assembly. The current insert plates have sharp-edged outer surfaces, for example hexagonally shaped. When torque is applied to the shaft, the shaft rotates the insert plate and the grinder roller assembly.

Currently, the clinker grinder roller is made by independently casting the grinder roller. The insert plate with its outer sharp edges is separately formed and machined. The sharp-edged insert plate is pressed into roller end cavities. The drive shaft is then inserted through the insert plate and the roller, after which the shaft is welded to an inner surface of the insert plate. Finally, shims are inserted between the insert plate and the roller to position the shaft at the center of the roller. The shims are then welded to the outer surface of the insert plate to secure them in place.

This presently available roller manufacturing process results in several shortcomings. First, the outer surface of the insert plate tends to pulls away from the inner surface of the clinker grinder roller during the welding of the shaft to the insert plate which can loosen the attachment between the insert plate and the roller. Second, the shims eventually wear and loosen. Third, since the roller cavity is a cast, in most cases the inner surfaces of the roller cavity are not flat which reduces the load bearing area between the insert plate and the roller. These three problems cause the clinker grinder roller to disengage from the insert plate, creating a loose fit which eventually leads to the failure of the device.

SUMMARY

In overcoming the drawbacks and other limitations of the related art, the present invention provides an improved grinder roller assembly and an improved method of forming a grinder roller assembly. In one embodiment of the invention, the insert plate has an outer surface that is noncircular and with smooth projections, the shaft and insert plate are attached together with fasteners, and the clinker grinder roller is cast directly over the insert plate which is done at a high metal cast temperature. The smooth projections on the insert reduce the stress concentration in the casting at the perimeter of the insert to help avoid hot tears and cracking during solidification and cooling of the cast iron. The use of fasteners eliminates the need to weld the insert plate to the shaft, resulting in an improved grinder roller assembly that is able to function for long periods without the insert plate pulling away and disengaging from the clinker grinder roller, and without the development of cracks.

In some embodiments, the present invention includes the insert plate having at least one recess on its outer surface, helping to interlock the insert plate with the roller. In addition, some embodiments feature the fasteners installed onto bores oriented at an acute angle relative to the longitudinal axis of the shaft and extend through the first bore and the second bore sections to attach the insert plate to the shaft.

The present invention further relates to a method of forming a grinder roller assembly. The method includes providing an insert plate that includes a plate outer surface that is noncircular and substantially smooth and casting the roller over the insert plate. The roller forms a roller opening that cooperates with the plate outer surface. The method further includes machining a bore through the insert plate and inserting into the bore a drive shaft with at least one fastener installed Further features and advantages of the present disclosure will become apparent from consideration of the following description and the appended claims when taken in connection with the accompanying drawings. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses. The term "substantially" used herein with reference to a physical parameter or quantity includes a variation in the recited physical parameter or quantity of an amount that is insubstantially different from a recited physical parameter or quantity for an intended purpose or function.

Figure 1:
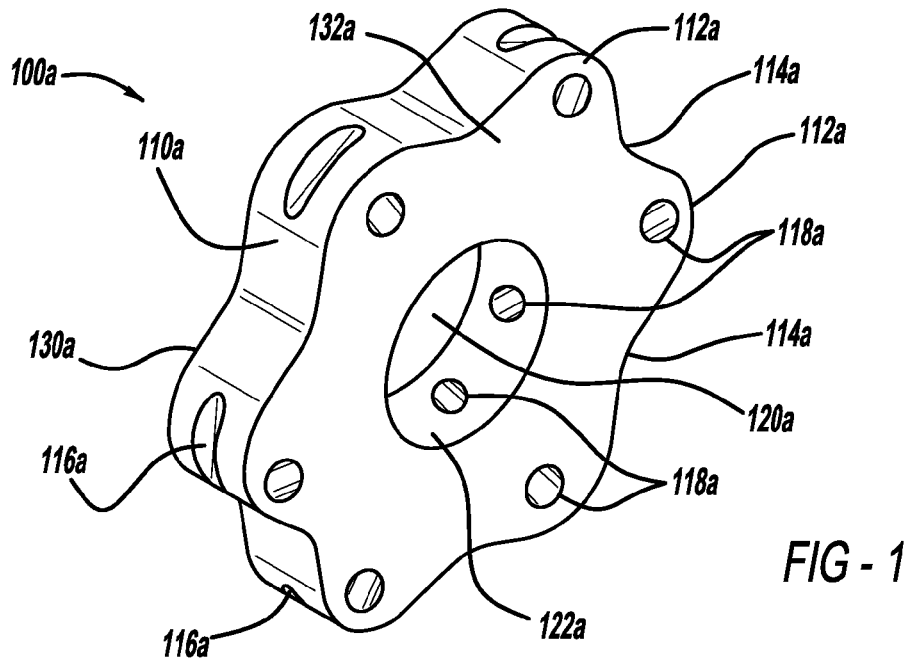
FIG. 1 is a perspective view of an insert plate of the roller assembly in accordance with some embodiments of the present invention.

FIG. 1 illustrates an insert plate 100a in accordance with some embodiments of the present invention. The insert plate 100a may be cast into its net shape, or machined from wrought material. The insert plate 100a has a noncircular outer surface 110a that is smooth or substantially smooth. As used herein, "smooth" means lacking sharp edges. In some embodiments, the insert plate 100a has on its outer surface 110a one or more projections, for example between one and ten lobes 112a. Between the lobes 112a are a corresponding number of troughs 114a. FIG. 1 shows a preferred embodiment with six lobes 112a and six troughs 114a. The lobes 112a and troughs 114a define the outer surface 110a. The outer surface 110a can be described as forming a filleted spline. The lobes 112a are spaced equally apart to define a periodic pattern.

The insert plate 100a also has central bore 120a that defines an inner surface 122a sized to closely receive a drive shaft. The insert plate 100a has an inwardly facing side 130a and an outwardly facing side 132a. Bores 118a span and extend through the insert plate 100a and 100b. Each bore 118a extends and spans from an opening on the outwardly facing side 132a to another opening on the inner surface 122a. The bores 118a are created during initial machining of the insert plate 100a or after it is cast into the roller 210, or a combination of during initial machining and after casting.

The insert plate also has one or more recesses 116a on the outer surface 110a. The recesses 110a may be formed as grooves, notches, undercuts, channels, or openings, for example. The recesses 116a are spaced equally apart. The recesses 116a are located on some or all of the lobes 112a. As pictured in FIG. 1, all of the lobes 112a have corresponding recesses 116a, such that the lobes 112a and the recesses 116a are equal in number.

The insert plate 100a is separately machined or cast, and is made of any suitable material, for example steel. Steel is comprised primarily of iron and carbon, and may contain other alloying additions such as manganese, silicon, chromium, nickel and molybdenum, either alone or in combination, to enhance mechanical properties, increase corrosion resistance, or otherwise improve the quality of the steel.

Figure 2:
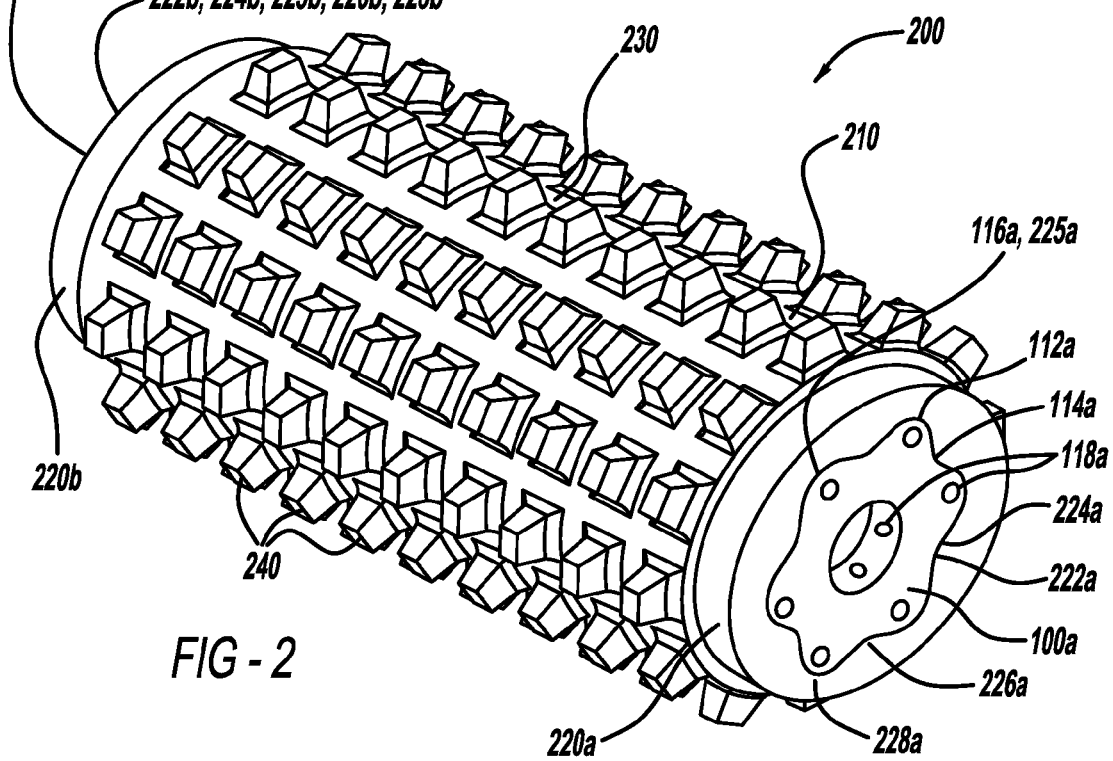
FIG. 2 is a perspective view of an apparatus comprising the insert plate of FIG. 1, a second insert plate, and a clinker grinder roller in accordance with some embodiments of the present invention.

FIG. 2 illustrates a grinder roller assembly 200 comprising the insert plate 100a of FIG. 1, a second insert plate 100b at its opposite end, and a clinker grinder roller 210. As shown in FIG. 2, the insert plate 100b has identical features as insert plate 100a, and thus the description of insert plate 100a above is incorporated by reference to describe the insert plate 100b, with reference character "b" used for elements of the insert plate 100b instead of reference character "a" for corresponding elements of the insert plate 100a. However, in some embodiments, the number of lobes 112b may be different in number as compared with the number of lobes 112a.

The clinker grinder roller 210 is cast over the insert plates 100a and 100b. After casting, the clinker grinder roller 210 includes a cylindrical outer portion 230 and end portions 220a and 220b. The end portions 220a and 220b have inner surfaces 222a and 222b, which define openings 224a and 224b. During casting, the recesses 116a and 116b of the insert plates 100a and 100b are filled with molten material (e.g. non-ductile abrasion-resistant alloyed cast iron) during the casting process to form corresponding projections 225a and 225b on the inner surfaces 222a and 222b. The projections 225a and 225b correspond to, directly contact and bond with, and mechanically cooperate with the recesses 116a and 116, to secure the insert plates 100a and 100b to the inner surfaces 222a and 222b after casting. The inner surfaces 222a and 222b of the roller 210 are formed to closely conform with the outer surfaces 110a and 110b of the insert plates 100a and 100b. The casting process can be performed utilizing a standard amount of superheat for the specific alloy being poured, or can utilize additional superheat or a substantially additional amount of superheat to compensate for heat sinks created by the insert plates. The amount of additional superheat provided may be up to about 150° C. This additional superheat slows solidification, preventing hot tears (cracks) in the solidified material. The clinker grinder roller 210 is made of any suitable material, for example non-ductile abrasion-resistant alloyed cast iron. Abrasion-resistant alloyed cast irons are a class of alloys consisting of iron and carbon to which alloying elements such as manganese, silicon, nickel, chromium, molybdenum and copper are added, either alone or in combination. The purpose of the alloying additions is to improve the corrosion resistance of the material, and cause the iron to form hard metallic carbides as it solidifies and cools. These hard metallic carbides are responsible for the abrasion-resistant qualities of the resulting cast iron.

After casting, the middle portion 230 has a cylindrical shape and includes rows and columns of grinders 240 (e.g. teeth) surrounding its exterior surface. In the middle portion 230 is a longitudinal center of the roller 210. During rotation, the cooperative interaction between the noncircular and smooth inner surfaces 222a and 222b of the end portions 220a and 220b and the noncircular and smooth outer surfaces 110a and 110b of the insert plates 100a and 100b reduces localized stresses by distributing loads evenly throughout the insert plate 100a and 100b.

Figure 3:
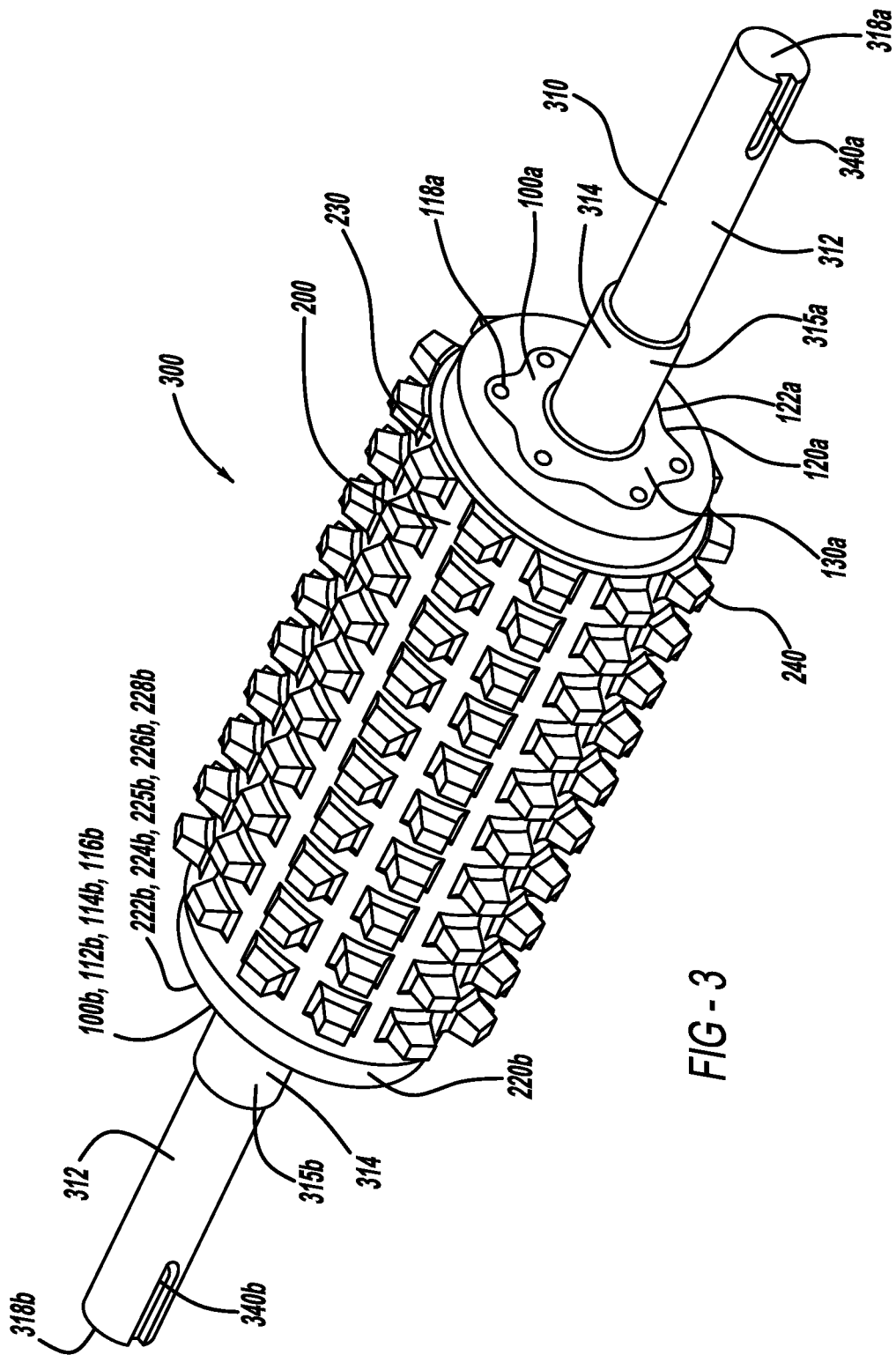
FIG. 3 is a perspective view of a grinder roller assembly including the apparatus of FIG. 2, an elongated shaft, and pins that attach the insert plates to the elongated shaft in accordance with some embodiments of the present invention.
Figure 4:
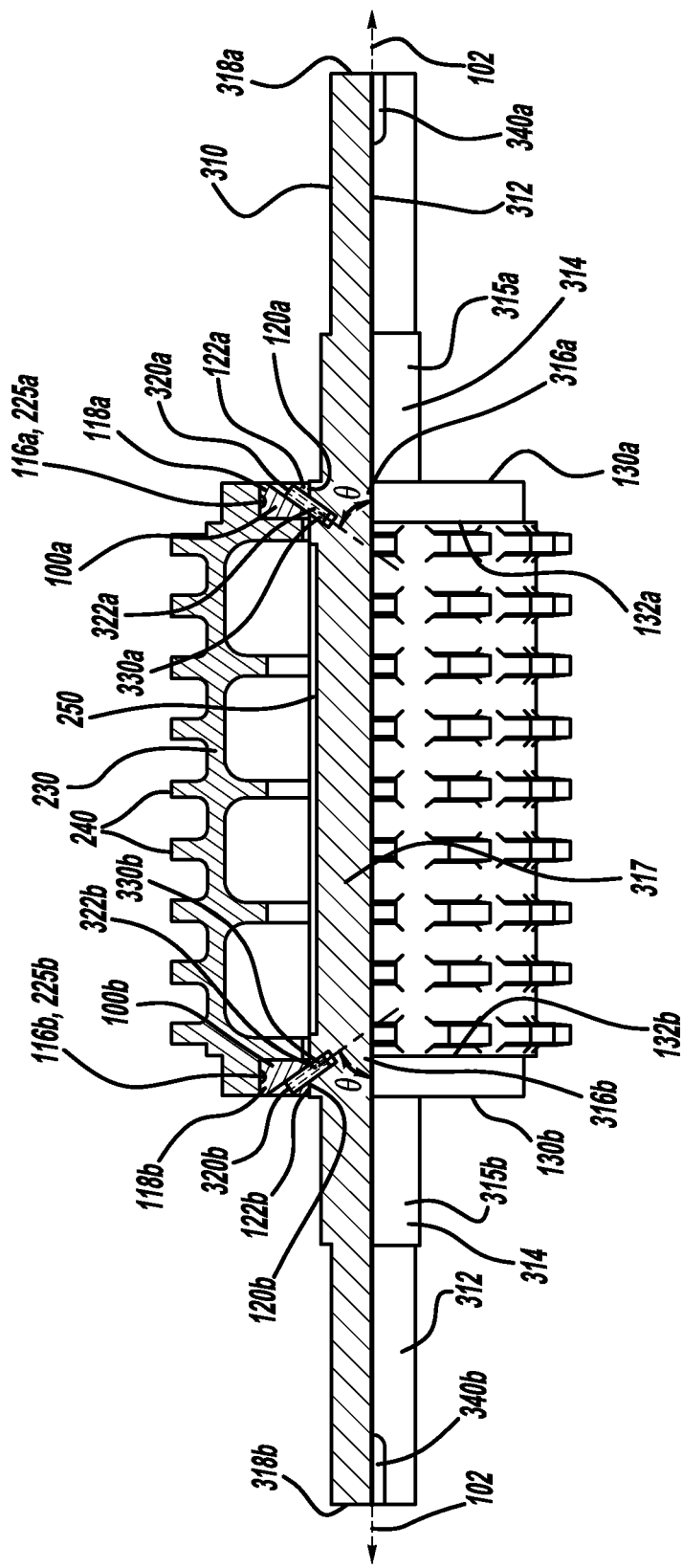
FIG. 4 is a partial cross sectional view of a grinder roller assembly including the apparatus of FIG. 2, an elongated shaft, and pins that attach the insert plates to the elongated shaft in accordance with some embodiments of the present invention.

FIG. 3 and FIG. 4 further illustrate a grinder roller assembly 300 in accordance with further embodiments of the present invention. The grinder roller assembly 300 includes the assembly 200 of FIG. 2, an elongated shaft 310, and pins 320a and 320b that respectively attach the insert plates 100a and 100b to the drive shaft 310. One skilled in the art will recognize that rollers other than the clinker grinder roller 210 may be used, and that fasteners other than the pins 320a and 320b shown in FIG. 3 and FIG. 4 may be used, without falling outside the spirit of the present invention. For example, the fasteners may be screws, woodruff keys, or any other fasteners known to one skilled in the art.

The middle portion 230 of the clinker grinder roller 210 has a cast opening or hole 250 which extends through its longitudinal length, and in some embodiments is cylindrical. The opening or hole 250 also has throughout its length a constant or substantially constant diameter that is greater than the diameters of the inner surfaces 122a and 122b of the bores 120a and 120b of the insert plates 110. The bores 120a and 120b are bored, for example with a lathe, and together with the opening or hole 250, form a cylindrical hole that extends through the clinker grinder roller 210 and insert plates 100a and 100b.

The elongated drive shaft 310 includes an inner portion 312 that extends the entire length of the shaft 310, and a sleeve 314 that is fastened about the inner portion 312. For example, the sleeve 314 is shrunk-fit over the inner portion 312. The inner portion 312 and the sleeve 314 each have cylindrical shapes, defining cylindrical outer surfaces. The sleeve 314 has end portions 315a and 315b, raised portions 316a and 316b, and interior portion 317. The shaft has a driver end 318a and a driven end 318b. In operation, the shaft 310 is rotated by applying torque to the shaft 310 at the driver end 318a. The rotation of the shaft 310 then causes rotation of the insert plates 100a and 100b, and clinker grinder roller 210. The grinding teeth 240 on the clinker grinder roller 210 then rotate and grind clinkers. During operation, the components of the grinder roller assembly 300 that are nearer the driver end 318a, for example the insert plate 100a, pins 320a, and end portion 220a, experience greater stresses than the components nearer the driven end 318b, for example the insert plate 100b, pins 320b, and end portion 220b.

The elongated shaft defines a longitudinal axis 102. The portion of the sleeve 314 including the raised portions 316a and 316b and the interior portion 317 has the same longitudinal length as the clinker grinder roller 210. Thus, the elongated shaft is inserted through the bores 120a and 120b, and the opening or hole 250, such that the raised portions 316a and 316b line up with the end portions 220a and 220b.

The elongated shaft 310 has a maximum diameter at the raised portions 316a and 316b that is equal to or up to about 0.006 inches less than the inner surfaces 122a and 122b of the openings 120a and 120b of the clinker grinder roller 210. Thus, the respective plate clearances between raised portions 316a and 316b and the inner surfaces 122a and 122b may take on any fractional or continuous value between 0 inches and about 0.006 inches (or even a negative or press fit clearance). The plate clearances are optimized to balance between ease of inserting the shaft 310 into the clinker grinder roller 210 and keeping the bending moment on the pins 320a and 320b low.

The diameter of the interior portion 317 is less than the diameter of the raised portions 316a and 316b. The diameters of the end portions 315a and 315b of the sleeve 314 are also less than the diameters of the raised portions 316a and 316b. The end portions 312a and 312b respectively have key ways or slots 340a and 340b on their ends for engaging other mechanical elements.

The inner portion 312 of the elongated shaft 310 is separately machined or cast, and is made of any suitable material, for example steel. 'Carbon or alloy' steels are selected to provide the strength and toughness required to resist the stresses imposed on the elongated shaft during grinder operation. The sleeve 314 is made of a harder material than the inner portion 312. The harder material reduces erosion where the shaft 310 is mounted, particularly at the raised portions 316a and 316b.

Bores 330a and 330b are machined or bored into the shaft 310, such that they span and extend through the exterior surface of the raised portions 316a and 316b and the inner portion 312 of the shaft 310. Alternatively, the bores 330a and 300b may span and extend through only the raised portions 316a and 316b and not the inner portion 312. The bores 320a and 330b are respectively coaxial with the bores 118a and 118b or these bores can all be formed in one boring step. If the bores 118a and 118b are formed first, they can pilot the drilling tool to form shaft bore 320a and 330b. In one method, after the shaft 310 is inserted into the grinder roller assembly 300, pins 320a and 320b may be respectively driven into the separately machined bores 118a and 118b of the insert plates 100a and 100b. The pin diameters may be chosen to produce a negative clearance or press fit within their respective bores.

When inserted, the pins 320a span and extend through the bores 118a and 330a, and the pins 330b span and extend through the bores 118b and 330b. The pins 320a and 320b thus secure or attach the shaft 310 to the clinker grinder roller 210. The pins 320a and 320b and bores 118a, 118b, 330a, and 330b are oriented at an acute angle (θ) with respect to a longitudinal axis 102. The first and second acute angle (θ) is chosen to obtain maximum engagement depth into the insert plates 100a and 100b and the shaft 310. For example, the acute angle (θ) may have a value ranging between about 45 and about 55 degrees.

The number of pins 320a, and thus their corresponding bores 330a, are preferably equal to the number of lobes 112a.

The pins 320a, and thus the bores 330a, are spaced angularly equally apart, for example. The pins 320a, and thus the bores 330a, may be located on sides of some or all of the lobes 112a. The pins 320b, and thus bores 330b, may be similarly placed on the lobes 112b and thus be equal in number with the lobes 112a. A greater number of pins 320a than pins 320b can be provided in view of the greater loads on the driving end than the driven end of the grinder roller. The number of pins 320a and 320b may also vary based on anticipated loads related to the ash being ground. In other embodiments, only one pin 320a and/or one pin 320b are used.

The pin size and materials are chosen to ensure that the pins 320a and 320b have high strength properties that can overcome a load produced by a stall motor condition during grinding. As mentioned above, pins 320a and 320b are press fit into their bores. The interference stress is additive to stresses resulting from grinding. The choice of surface finishes of the pins 320a and 320b and the bores 330a and 330b also helps set the interference stress level. The interference stress is optimized to (1) exceed minima for securing the pins 320a and 320b in place, (2) stay below the maxima for overloading the bores 330a and 330b during grinding, (3) and ensure the pins remain preloaded during the both forward and reverse rotation of the grinder roller assembly 300. Without the interference stress, slippage between the insert plates 100a and 100b and the elongated shaft 310 increases over time, leading to equipment failure. Matching the number of pins 320a and 320b to the respective number of lobes 112a and 112b also optimizes the load bearing ability of the grinder roller assembly 300. The pins 320a and 320b further have through holes 322a and 322b which define pin inner diameters. The through holes 322a and 322b allow air to escape from the bores 330a and 330b during assembly.

In some embodiments, Woodruff keys or square keys may be used rather than the pins 320a and 320b. The shaft 310 may have an opening and the clinker grinder roller 210 may have a longitudinal slot adjacent to the semi-circular opening to accommodate the installation of the key. A Woodruff key may be inserted longitudinally inside the semi-circular opening and longitudinal slot to secure the shaft 310 to the clinker grinder roller 210, and may have a protruding portion extending longitudinally away from the clinker grinder roller 210. Using mechanical fasteners such as pins 320a and 320b, or keys, eliminates heat induced bonding failure at the interference between insert plates 100a and 100b and the roller 210. If welding processes are used to attach inserts 100a and 100b to shaft 310, the inserts expand and contract relative to the roller 210, breaking the bond between them, and often creating cracks in the cast roller.

Figure 5:
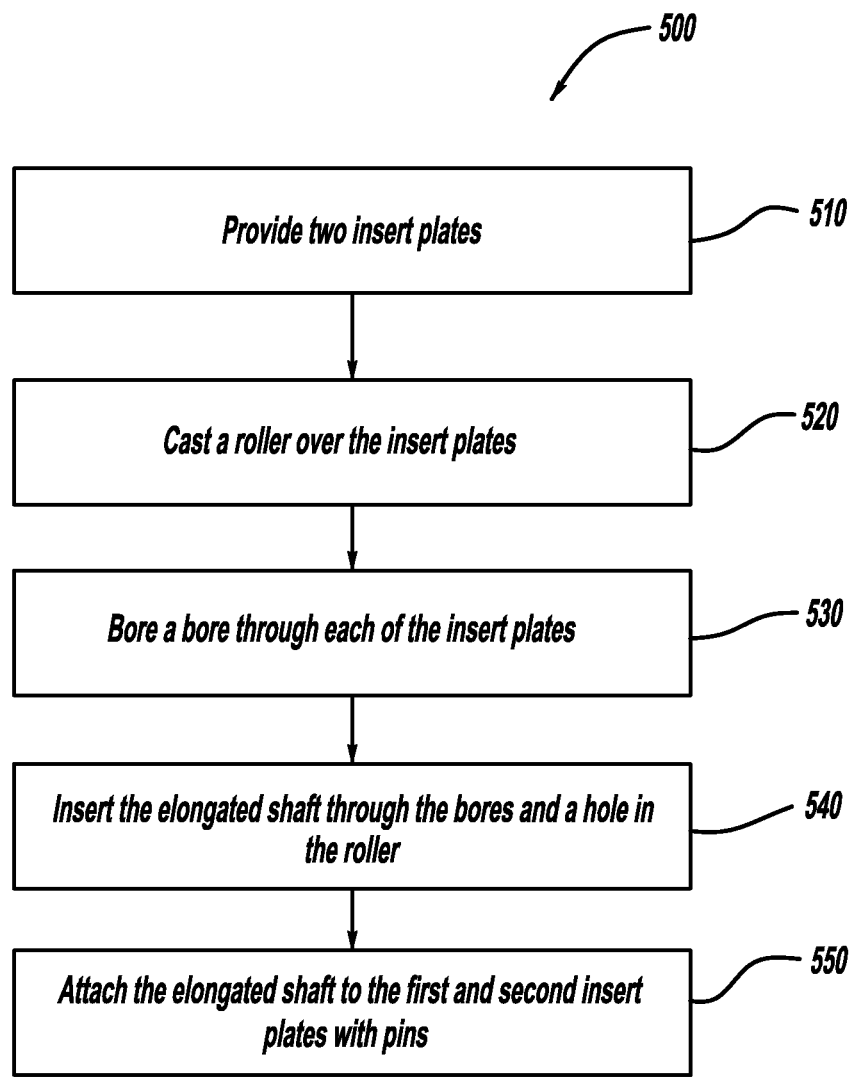
FIG. 5 is a flowchart depicting a method of forming a grinder roller assembly in accordance with some embodiments of the present invention; and The drawings described herein are for illustration purposes only and are not intended to limit the scope of the present invention.

FIG. 5 illustrates a method 500 of forming the grinder roller assembly 300 in accordance with the present disclosure. The ordering of the steps presented herein is merely one implementation of the method 500. Those skilled in the art will recognize that the ordering may be varied, that some steps may occur simultaneously, that some steps may be omitted, and that further steps may be added.

The method 500 starts in block 510. In block 510, the insert plates 100a and 100b are provided. The method 500 proceeds from block 510 to block 520. In block 520, the clinker grinder roller 210 is cast over the insert plates 100a and 100b. The recesses 116a and 116b of the insert plates 100a and 100b are filled with molten material (e.g. non-ductile abrasion-resistant alloyed cast iron) during the casting process to form corresponding projections 225a and 225b on the inner surfaces 222a and 222b. The projections 225a and 225b correspond to, mate with, and mechanically cooperate with the recesses 116a and 116, helping to respectively secure the insert plates 100a and 100b to the inner surfaces 222a and 222b after casting. During casting, additional superheat above that typically used for the specific alloy being employed may be used. The amount of additional superheat provided may be greater or substantially greater than zero, and up to about 150° C. The method 500 proceeds from block 520 to block 530.

In block 530, bores 120a and 120b is bored through the insert plates 100a and 100b. The bores 120a and 120b may be bored with a lathe or boring mill. The method 500 proceeds from block 530 to block 540.

In block 540, the elongated shaft 310 is inserted through the bores 120a and 120b and the opening or hole 250. The method 500 proceeds from block 540 to block 550.

In block 550, the elongated shaft 310 is attached to the insert plate 100a with at least one first pin 320a and to the insert plate 100b with at least one second pin 320a. There may be a number of first pins 320a and second pins 320b.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

What is claimed is:

1. A grinder roller assembly comprising:
an elongated drive shaft forming a cylindrical shaft outer surface and defining a longitudinal axis;
an insert plate including:
a plate outwardly facing side having a noncircular perimeter and extending perpendicular to the longitudinal axis;
a plate outer surface extending along the longitudinal axis
a bore defining a plate inner cylindrical surface and configured to closely receive the elongated drive shaft;
a roller formed to closely conform with the plate outer surface, the roller including a roller cylindrical opening that defines a roller inner surface; and
at least one fastener extending between the insert plate and the shaft that attaches the insert plate to the shaft, the at least one fastener extending through at least one fastener bore in the first plate extending from an opening on the plate outwardly facing side to another opening on the plate inner cylindrical surface.

2. The grinder roller assembly of claim 1 wherein the plate outer surface includes a plurality of lobes.

3. The grinder roller assembly of claim 1 wherein the at least one fastener is a plurality of fasteners and the at least one fastener bore is a plurality of fastener bores equal in number to the plurality of fasteners.

4. The grinder roller assembly of claim 3 wherein the plate outwardly facing side includes a plurality of lobes that are equal in number to the plurality of fasteners.

5. The grinder roller assembly of claim 3 wherein the fastener bores are oriented at acute angles relative to the longitudinal axis.

6. The grinder roller assembly of claim 5 wherein the acute angles each face in a direction away from a longitudinal center of the roller.

7. The grinder roller assembly of claim 1 wherein the at least one fastener bore extends into the elongated shaft.

8. The grinder roller assembly of claim 1, wherein the insert plate is a first insert plate with a first plate outwardly facing side, a first plate outer surface, a first bore, and at least one first fastener bore, and the at least one fastener is at least one first fastener, the grinder roller further comprising:

a second insert plate opposite the first insert plate, including:
a second plate outwardly facing side having a noncircular perimeter and extending perpendicular to the longitudinal axis;
a second plate outer surface extending along the longitudinal axis; and
a second bore defining a second plate inner cylindrical surface and configured to closely receive the elongated drive shaft;
the roller formed to closely conform with the second plate outer surface; and
at least one second fastener extending between the second insert plate and the shaft that attaches the second insert plate to the shaft.

9. The grinder roller assembly of claim 8 wherein the at least one first fastener is a first plurality of fasteners, and wherein the at least one second fastener is a second plurality of fasteners consisting of a greater number of fasteners than the first plurality of fasteners.

10. The grinder roller assembly of claim 8 wherein the elongated shaft defines a longitudinal axis, and wherein each of the first plurality of fasteners is oriented in a first direction at a first acute angle relative to the longitudinal axis, and wherein each of the second plurality of fasteners is oriented in a second direction at a second acute angle relative to the longitudinal axis that the first and second directions forming mirrored angles relative to a radial plane.

11. The grinder roller assembly of claim 1 wherein the first insert plate further includes at least one recess on the first plate outer surface, wherein the roller further is formed to conform with the recess to aid in axially interlocking the insert and the roller.

12. The grinder roller assembly of claim 1 wherein the elongated shaft is made of steel.

13. The grinder roller assembly of claim 1 wherein the first insert plate is made of steel.

14. The grinder roller assembly of claim 1 wherein the roller is made of non-ductile abrasion-resistant alloyed cast iron.

15. The grinder roller assembly of claim 1 wherein a the roller is made of non-ductile abrasion-resistant alloyed cast iron resistant to erosion, corrosion, or a combination thereof.

16. The grinder roller assembly of claim 1 wherein the shaft includes an inner portion and a sleeve fastened about the inner portion.

17. The grinder roller assembly of claim 1 wherein a diameter of the first plate inner surface is greater than a diameter of the shaft cylindrical outer surface by less than about 0.006 inches.

18. A grinder roller assembly comprising:
an elongated drive shaft forming a shaft cylindrical outer surface and having a first bore formed at an acute angle relative to a longitudinal axis of the shaft;
an insert plate including:
a plate outwardly facing side having a noncircular perimeter and extending perpendicular to the longitudinal axis;
a plate outer surface extending along the longitudinal axis;
a plate bore defining a plate inner cylindrical surface and configured to closely receive the elongated shaft;
at least one recess on the plate outer surface; and
a second bore aligned with the first bore of the shaft and extending from an opening on the plate outwardly facing side to another opening on the plate inner cylindrical surface;

a roller formed to closely to conform with the plate outer surface, the roller including a roller cylindrical opening that defines a roller inner surface; and at least one fastener that is installed to extend through the first bore and the second bore to attach the insert plate to the elongated shaft.

19. The grinder roller assembly of claim 18 wherein the plate outer surface includes a plurality of lobes.

20. A method of forming a grinder roller assembly, the method comprising:

providing an insert plate that includes a plate outwardly facing side having a noncircular perimeter and a plate outer surface bounding the outwardly facing side;

casting a roller over the insert plate to form the roller to closely conform to the plate outer surface;

forming a bore through the insert plate, the bore forming an inner cylindrical surface;

inserting an elongated shaft through the bore; and attaching the elongated shaft to the insert plate with at least one fastener extending between the insert plate and the shaft through at least one fastener bore extending from an opening on the plate outwardly facing side through another opening on the inner cylindrical surface into the elongated shaft.

21. The method of claim 20 wherein forming the bore in the insert plate is done with a lathe or a boring mill.

22. The method of claim 20 wherein casting the roller over the insert plate comprises filling at least one recess on the plate outer surface with molten material during casting to form at least one projection on the roller inner surface that mates with the at least one recess.

23. The method of claim 22, wherein a temperature of the molten material includes a greater amount of superheat, but no more than about 150° C. greater, than would typically be used for the specific cast iron grade being poured.

24. The method of claim 22, wherein the plate outer surface includes at least one lobe, and wherein the at least one recess is located on the at least one lobe.

25. The method of claim 20 wherein the elongated shaft defines a longitudinal axis, and wherein the least one fastener is a plurality of fasteners that are each oriented at an acute angles relative to the longitudinal axis.

26. The method of claim 25 wherein each of the acute angles face in a direction away from a longitudinal center of the roller.

\* \* \* \* \*